US009047577B2

(12) United States Patent
Deng et al.

(10) Patent No.: US 9,047,577 B2
(45) Date of Patent: Jun. 2, 2015

(54) EXTENSIBLE SUPPORT SYSTEM FOR SERVICE OFFERINGS

(75) Inventors: Yu Deng, Yorktown Heights, NY (US); Murthy V. Devarakonda, Peekskill, NY (US); Michael Reuben Head, Tarrytown, NY (US); Rafah A. Hosn, New York, NY (US); Andrzej P. Kochut, Elmsford, NY (US); Jonathan Paul Munson, Putnam Valley, NY (US); Hidayatullah Habeebullah Shaikh, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 13/613,298

(22) Filed: Sep. 13, 2012

(65) Prior Publication Data

US 2013/0013462 A1 Jan. 10, 2013

Related U.S. Application Data

(63) Continuation of application No. 12/789,712, filed on May 28, 2010, now Pat. No. 8,700,777.

(51) Int. Cl.
*G06F 15/16* (2006.01)
*G06Q 10/06* (2012.01)
*G06F 9/50* (2006.01)
*G06F 12/00* (2006.01)

(52) U.S. Cl.
CPC .............. *G06Q 10/06* (2013.01); *G06F 9/5011* (2013.01); *G06F 9/5072* (2013.01)

(58) Field of Classification Search
USPC .................. 709/203, 217–219, 223–229, 250
See application file for complete search history.

(56) References Cited

U.S. PATENT DOCUMENTS

| | | | |
|---|---|---|---|
| 5,870,717 A | 2/1999 | Wiecha | |
| 5,903,643 A | 5/1999 | Bruhnke | |
| 6,459,702 B1 | 10/2002 | Saaverda et al. | |
| 6,538,998 B1 | 3/2003 | Garimella | |
| 6,914,973 B2 | 7/2005 | Marsico | |
| 7,058,716 B1 | 6/2006 | Sundaresan et al. | |
| 7,114,146 B2 | 9/2006 | Zhang et al. | |
| 7,281,046 B1 | 10/2007 | Sunderasan et al. | |
| 7,496,652 B2 | 2/2009 | Pezzutti | |
| 7,502,850 B2 | 3/2009 | Fellenstein et al. | |
| 7,941,804 B1 | 5/2011 | Herington et al. | |
| 8,019,066 B1 | 9/2011 | Efrati et al. | |
| 8,234,387 B2 | 7/2012 | Bradley et al. | |
| 8,478,849 B2 * | 7/2013 | Marl et al. | 709/223 |
| 8,538,895 B2 | 9/2013 | Appelman et al. | |

(Continued)

OTHER PUBLICATIONS

L. Li et al., "E-Business Process Modeling with Finite State Machine Based Service Agents," CSCWD, 2008, pp. 261-272.
Y. Zhou et al., "Reasoning Over Ontologies of On Demand Service," Proceedings of the 2005 IEEE International Conference on e-Technology, e-Commerce and e-Service (EEE'05) on e-Technology, e-Commerce and e-Service, 2005, 4 pages.

(Continued)

*Primary Examiner* — Zarni Maung
(74) *Attorney, Agent, or Firm* — Louis J. Percello; Ryan, Mason & Lewis, LLP

(57) ABSTRACT

Techniques are disclosed for integration, provisioning and management of entities and processes in a computing system such as, by way of example only, business entities and business processes. In particular, techniques are disclosed for implementing an extensible support system for multiple service offerings. For example, such a support system can be a business support system which may be employed in conjunction with a cloud computing environment.

7 Claims, 8 Drawing Sheets

(56) References Cited

U.S. PATENT DOCUMENTS

| | | | |
|---|---|---|---|
| 8,925,818 B2* | 1/2015 | Kosecki et al. | 235/449 |
| 2001/0027470 A1 | 10/2001 | Ulmer et al. | |
| 2002/0010724 A1 | 1/2002 | Sterling et al. | |
| 2002/0091533 A1 | 7/2002 | Ims et al. | |
| 2002/0101881 A1 | 8/2002 | Sundaresan et al. | |
| 2002/0116638 A1 | 8/2002 | Dobes et al. | |
| 2002/0156733 A1 | 10/2002 | Shimada et al. | |
| 2002/0184405 A1 | 12/2002 | Omori et al. | |
| 2003/0120502 A1 | 6/2003 | Robb et al. | |
| 2004/0162741 A1 | 8/2004 | Flaxer et al. | |
| 2004/0186903 A1 | 9/2004 | Lambertz | |
| 2004/0199657 A1* | 10/2004 | Eyal et al. | 709/231 |
| 2004/0267627 A1 | 12/2004 | Rippingale et al. | |
| 2005/0066272 A1 | 3/2005 | Sterling et al. | |
| 2006/0050862 A1 | 3/2006 | Shen et al. | |
| 2007/0072605 A1 | 3/2007 | Poczo | |
| 2007/0143457 A1 | 6/2007 | Mao et al. | |
| 2007/0294762 A1 | 12/2007 | Shraim et al. | |
| 2007/0297350 A1 | 12/2007 | Eilam et al. | |
| 2008/0021799 A1 | 1/2008 | Blowers | |
| 2008/0040281 A1 | 2/2008 | Chakraborty et al. | |
| 2008/0281904 A1 | 11/2008 | Conrad et al. | |
| 2009/0183168 A1 | 7/2009 | Uchida | |
| 2011/0119530 A1 | 5/2011 | Lazzaro | |
| 2011/0145365 A1 | 6/2011 | Beattie, Jr. et al. | |
| 2011/0296018 A1* | 12/2011 | Deng et al. | 709/226 |
| 2013/0185707 A1* | 7/2013 | Kosecki et al. | 717/169 |

OTHER PUBLICATIONS

P. Mell et al., "Cloud Computing Definition," National Institute of Standards and Technology, Version 15, Oct. 2009, 2 pages.

Mike P. Papazoglou, "Service-Oriented Computing: Concepts, Characteristics and Directions," Proceedings of the Fourth International Conference on Web Information Systems Engineering (WISE), Dec. 2003, pp. 3-12, vol. 3.

Lixin Tao, "Shifting Paradigms with the Application Service Provider Model," Computer, Oct. 2001, pp. 32-39, vol. 34, No. 10.

Neal Leavitt, "Is Cloud Computing Really Ready for Prime Time?" Computer, Jan. 2009, pp. 15-20, vol. 42, No. 1.

N. Feamster et al., "How to Lease the Internet in Your Spare Time," ACM SIGCOMM Computer Communication Review, Jan. 2007, pp. 61-64, vol. 37, No. 1.

George Lawton, "Developing Software Online with Platform-as-a-Service Technology," Computer, Jun. 2008, pp. 13-15, vol. 41, No. 6.

H. Xie et al., "P4P: Provider Portal for Applications," ACM SIGCOMM Computer Communication Review, Aug. 2008, pp. 351-362, vol. 38, No. 4.

I. Foster et al., "Grid Services for Distributed System Integration," Computer, Jun. 2002, pp. 37-46, vol. 35, No. 6.

Brian Hayes, "Cloud Computing," Communications of the ACM, Jul. 2008, pp. 9-11, vol. 51, No. 7.

W.-T. Tsai et al., "Service-Oriented Cloud Computing Architecture," Seventh International Conference on Information Technology: New Generations (ITNG), Apr. 2010, pp. 684-689.

* cited by examiner

100

300

400

800

EXTENSIBLE SUPPORT SYSTEM FOR SERVICE OFFERINGS

CROSS-REFERENCE TO RELATED APPLICATION

This application is a Continuation of U.S. patent application Ser. No. 12/789,712, filed on May 28, 2010, the disclosure of which is incorporated herein by reference. The present application is also related to U.S. patent application Ser. No. 12/789,653.

FIELD

The field relates generally to integration, provisioning and management of entities and processes in computing systems and, more particularly to an extensible support system for multiple service offerings.

BACKGROUND

Cloud computing is a new computing model attempting to mask complexities of large scale computing systems and provide users with easy to use, flexible, and scalable services. The cloud computing paradigm can be applied to provide a wide range of services at various levels of a computing stack ranging from infrastructure (where users gain access to virtual machines (VM) and are responsible for providing and maintaining an operating system and applications within the VM container) to applications where users obtain remote access to fully managed applications. A cloud platform normally has two parts: a business support system (BSS) and an operational support system (OSS).

A BSS is used to manage the interactions between clients and the back end OSS via a network environment on a cloud platform. Such interactions may include, but are not limited to, user account management, resource management, and billing/payment management. These functions differ in specifics from one service offering to another. Different service offerings may utilize different user roles, require different associations among offerings, and have different fulfillment procedures when processing orders.

SUMMARY

Embodiments of the invention provide, for example, methods, apparatus, articles of manufacture, systems, and data structures for integration, provisioning and management of entities and processes in a computing system such as, by way of example only, business entities and business processes. In particular, embodiments of the invention provide an extensible support system for multiple service offerings. For example, such a support system can be a business support system which may be employed in conjunction with a cloud computing environment.

In accordance with one embodiment of the invention, a business support system (BSS) for provisioning computing network assets to one or more users for users to operate and manage the assets comprises the following components.

The system comprises one or more user interfaces that provide service offering information to a user about service offerings of a plurality of service providers. The system also comprises a selection function on the user interface used to select one or more of the service offerings. Further, the system comprises one or more interfaces that connect to one or more locations on one or more networks, each of the locations having one or more network assets associated with the selected service offering and the respective service provider. Still further, the system comprises a mapping function that matches the user selection to one or more provisioning processes, wherein when the provisioning processes are executed, and one or more physical network resources are provisioned to the user from one or more of the network locations in an order that the user can use the service.

Further embodiments of the invention comprise methods, apparatus, and articles of manufacture that provide for implementing such a support system.

Advantageously, embodiments of the invention provide techniques for using domain knowledge to manage multiple service offerings in the same business support system by attaching processes (in the form of state machines, rules, or other implementations) to ontology nodes (in an ontology domain knowledge base) such that the work-flows are captured by the processes and the relationships between resources and processes are captured by the ontology.

These and other features, objects and advantages of embodiments of the present invention will become apparent from the following detailed description of illustrative embodiments thereof, which is to be read in connection with the accompanying drawings.

DETAILED DESCRIPTION

Figure 1:
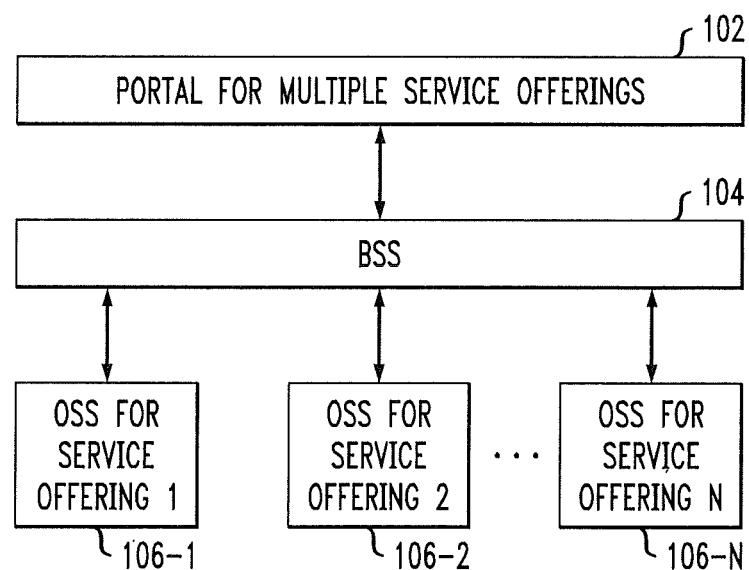
FIG. 1 is a block diagram of an overview of a business support system and its operating environment that associates multiple service users to multiple service providers, in accordance with an embodiment of the invention.

Embodiments of the present invention will be described herein in the context of illustrative embodiments of methods, apparatus, articles of manufacture, systems, and data structures for providing business support services. It is to be appreciated, however, that the embodiments of the present invention are not limited to the specific methods, apparatus, articles of manufacture, systems, and data structures, or types of support services illustratively shown and described herein. Rather, the principles of the invention are directed broadly to techniques related to integration, provisioning and management of entities and processes in computing systems. For this reason, numerous modifications can be made to the embodiments shown that are within the scope of the present invention. That is, no limitations with respect to the specific embodiments described herein are intended or should be inferred.

For example, embodiments of the invention may apply to an "enterprise." As used herein, the term "enterprise" is understood to broadly refer to any real-world entity that is created or formed to achieve some purpose, examples of which include, but are not limited to, an undertaking, an endeavor, a venture, a business, a concern, a corporation, an establishment, a firm, an organization, or the like. While illustrative embodiments of the invention may refer to a "business," it is understood that a "business" is only one example of an enterprise to which principles of the invention may apply.

Further, as used herein, the term "process" generally refers to one or more methodologies, one or more steps, one or more algorithms, one or more operations, one or more actions, one or more ways of performing functions and/or tasks, that are associated with an entity. Thus, "business processes" are processes that are associated with a particular business and performed in accordance with one or more computing systems associated with that particular business.

Information and/or computing services are offered and provided by, for example, a cloud computing resource service provider. Customer self-service for enrollment, subscription, service configuration and other related business functions may be a significant feature for cost-effective delivery of cloud offerings. Such functions may be grouped together and known as a business support system (BSS). Services of a BSS may be delivered through Web or Internet computing services and hosted in one or more centralized data centers (e.g., one or more compute clouds that form a computing system).

The term "cloud computing" is typically defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction, see, Cloud Computing Definition, National Institute of Standards and Technology, Version 15, Oct. 2009, the disclosure of which is incorporated by reference herein.

However, it is to be understood that embodiments of the invention are not intended to be limited to this particular definition of cloud computing, and that other suitable computing environments are contemplated as being within the scope of the invention.

It is known that traditional BSSs have been built to serve specific service offerings. A "service offering" is generally known to be a service that is offered to customers (clients) by a service provider. The type of service can be any type of service that is capable of being offered via the system offering the service.

However, as Web-delivered service offerings have proliferated, it has been realized in accordance with embodiments of the invention, that it is desirable to design a general-purpose BSS that can be tailored to serve a variety of service offerings, even multiple service offerings simultaneously. Such a BSS should preferably reflect the different services offered by the service offering, the relationships among the offerings, what provisioning actions need to be taken when services are ordered, what user roles are required by the service offering, and what service-management actions users in each role are enabled to perform. A "role" is a named set of one or more users who are associated with capabilities that may be defined by a service provider for a service offering. These are illustrative features that a BSS formed in accordance with embodiments of the invention provides.

A common cloud platform typically offers multiple service offerings, e.g., Desktop as a Service (DaaS), Software as a Service (SaaS) or Virtual Storage Cloud (VSC). It is to be understood that embodiments of the invention are not limited to any particular service offerings. Nonetheless, for purposes of a better understanding of illustrative embodiments, service offerings such as DaaS, SaaS and VSC will be referred to herein. These services may be generally described as follows.

DaaS (Desktop as a Service) provides virtual desktop infrastructure based on application streaming and virtualization technology. The DaaS service provider manages the back-end responsibilities of data storage, backup, security and upgrades. The customer's personal data is copied to and from the virtual desktop during logon/logoff and access to the desktop is device, location and network independent.

SaaS (Software as a Service) is a software delivery method that provides access to software and its functions remotely as a Web-based service. With SaaS, a provider licenses an application to customers as a service on demand, through a subscription or a "pay-as-you-go" model.

VSC (Virtual Storage Cloud) provides storage infrastructure as a service to clients. VSC saves clients investment in personnel, in hardware and in physical storage space.

These service offerings may have similar business support requirements, such as adding a user account and renewing a service subscription. Advantageously, it is realized in accordance with embodiments of the invention that, in the best interests of the clients and service providers, it is important to generalize such business requirements and manage them in one BSS instance on the common cloud platform.

FIG. 1 shows an overview of a BSS and its operating environment that associates multiple service users (i.e., clients or customers) to multiple service providers, in accordance with an embodiment of the invention. That is, system architecture 100 includes a portal 102 for clients to interface with multiple service offerings. The portal 102 is operatively coupled to a single BSS, i.e., the BSS 104. The BSS 104 is operatively coupled to the multiple OSSs (operational support systems) for each service offering, i.e., OSS 106-1 (service offering 1), OSS 106-2 (service offering 2) . . . OSS 106-N (service offering N). These OSS systems support the service offerings, themselves, as provided by their respective service providers, for example, OSS 106-1 may implement a DaaS offering, OSS 106-2 may implement an SaaS offering, and OSS 106-3 may implement a VSC offering.

In general, the BSS 104 interprets requests from the portal 102, and sends corresponding instructions to the appropriate OSSs 106-1, 106-2 . . . 106-N. The portal 102 serves multiple service offerings. Therefore, potentially, the requests need to be routed to different OSSs. The portal 102 also sends replies and other information to the user.

Furthermore, it is to be understood that the portal 102 serves as one or more user interfaces (e.g., graphical user interfaces) that provide service offering information to the user about service offerings of a plurality of service providers (i.e., in accordance with the OSSs 106-1, 106-2 . . . 106-N). Also, it is to be appreciated that the portal 102 comprises a selection function that allows the user to select one or more of the service offerings. Given the inventive teachings provided herein, one ordinarily skilled in the art will appreciate various straightforward implementations of the one or more interfaces of the portal 102.

At the business level, different service offerings may have similar requirements for business support services. Such requirements may include user management, offering management, order/subscription management, entitlement, billing and payment. A simple existing solution for service providers is to provide separate business support services for each service offering to which a client subscribes. However, it is extremely inconvenient for clients to access the subscribed services. In addition, it is time-consuming for service providers to update the business support services when certain processes are changed for multiple (connected) service offerings.

Embodiments of the invention provide an approach to provide business support services for multiple service offerings. A core component of this approach is the provision of one or more domain specific ontology nodes that encode the semantics of resources involved in the service offerings. It is to be appreciated that an ontology is generally known to be a specification of how to represent objects, concepts, processes and entities that are assumed to exist in some area of interest and relationships that hold among them. For each ontology node according to an embodiment of the invention, state machines and rules may be attached to translate a request from the portal 102 to a list of actions to be executed by the BSS 104 and corresponding OSS backend systems 106. The inventive approach also allows customization for a specific service offering in order to correctly interpret and execute a user's (client's) requests in that context.

While there exist tools for expressing specific service-offering requirements for a BSS, such as Unified Modeling Language (UML) and Business Process Modeling Notation (BPMN), service-offering developers must still develop BSSs using low-level programming tools, with reuse limited to low-level BSS-related modules. There are programming systems that allow high-level development within a certain domain, such as graphical user interface (GUI) development systems, and Business Process Execution Language (BPEL) based process-definition systems. However, unlike the inventive approach, these tools do not offer the core concepts of a BSS such as, for example, expression of relationships among offerings related to purchasing, and hence cannot offer them as foundational elements of the programming system. Also, unlike the inventive approach, these programming systems do not offer a runtime framework that enables multiple service offerings to be supported by a single BSS for users to purchase and manage multiple services from a single user portal.

These existing tools generally address these problems by "hard-coding" the processes required for a particular user and/or service offering. Each of these code structures only addresses a specific configuration for a particular service and/or user. To change configuration of a service offering in these existing systems would require a re-write of the code. This is inflexible, expensive, and time-consuming.

Embodiments of the invention provide a solution on how to manage multiple OSS systems in the same BSS system and how to map a user's request to a list of actionable steps involving multiple OSS systems.

First of all, it is not easy for the existing tools or systems to provision network assets for different configuration of service offerings or users. A re-writing of the system might be needed to accommodate the new service offerings or offers.

Secondly, unlike the inventive approach, the existing systems do not provide a systematic approach for a BSS to flexibly connect to multiple operational support systems via service offerings, which by definition need support from those operational support systems.

Thirdly, unlike the inventive approach, the existing systems do not provide a mechanism to easily associate entities (e.g., business entities such as offerings and their relationships) with corresponding processes (e.g., business processes such as provisioning and upgrading). In accordance with embodiments of the invention, such a mechanism facilitates the assembly of processes at runtime and reuse of processes for the same entities. It also facilitates the configuration changes on entities and processes without requiring a new system design or system rework.

Furthermore, because of the modern proliferation of cloud computing environments, users desire to acquire services from multiple service providers. In the existing systems, the users have to engage each service provider individually. Unlike the inventive approach, the existing systems do not permit the user to access services from multiple providers easily from one source. Also, unlike the inventive approach, the existing systems do not allow multiple services providers to provide services through one portal and to change the service offerings in a dynamic way through that single portal.

Accordingly, embodiments of the invention provide techniques for using domain knowledge to manage multiple service offerings in the same BSS system (e.g., BSS 104). One key point is to attach processes (in the form of state machines, rules, or other implementations) to ontology nodes (in an ontology domain knowledge base, as will be explained below) such that the work-flows are captured by the processes and the relationships between resources and processes are captured by the ontology. Many advantages flow from such inventive techniques, by way of example only: (1) business processes are localized in ontology nodes so that the impact of process changes can be minimized; (2) there is no need to develop a business support system for each service offering; and (3) the BSS system is extensible and scalable, and thus it becomes easy to add business support capabilities into a new service offering.

Figure 2:
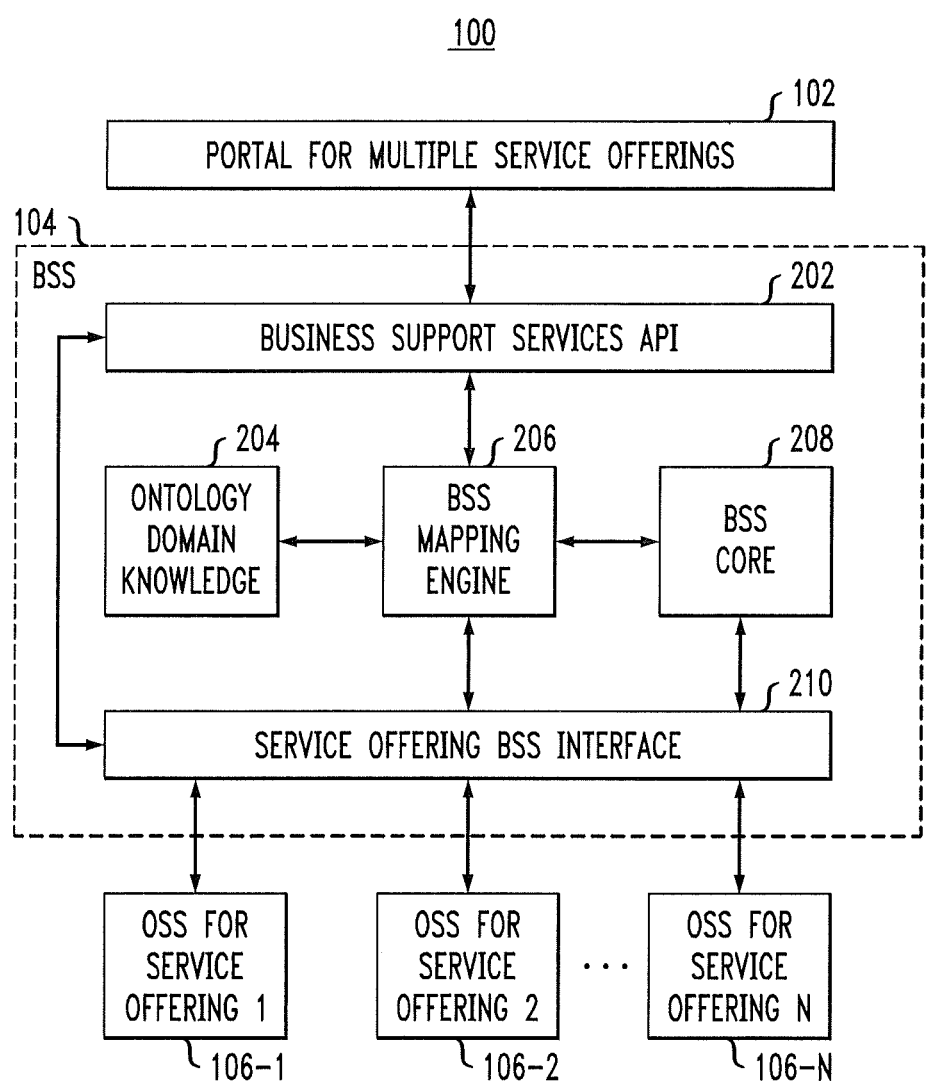
FIG. 2 is a block diagram of components of a business support system and its operating environment, in accordance with an embodiment of the invention.

FIG. 2 shows components of a business support system and its operating environment, in accordance with an embodiment of the invention. That is, FIG. 2 shows the same system architecture 100 that is shown in FIG. 1, but with a more detailed depiction of components that make up the BSS 104. Thus, as shown, the BSS 104 comprises the following components.

BSS application programming interface (API) module 202: This is the API used for interacting with the portal 102. The operations in this API may include but are not limited to: adding a user, updating a payment, uploading images, submitting a shopping cart and presenting subscriptions. Examples of subscription related activities can include, but not be limited to, creating one or more account entries that associate a change in a set of assets with the user requesting the service offering. The account entries can include, for example, one or more of: a status change for the user, a list of assets for the user, a change in a list of asset for the user, a charge, and a credit. Given the inventive teachings provided herein, one ordinarily skilled in the art will appreciate various straightforward implementations of the BSS API 202.

Ontology domain knowledge repository module 204: This is the knowledge base containing information about relationships between resources and how user requests should be handled. This repository is where the ontology nodes reside and are accessed.

BSS mapping engine module 206: This is the engine which maps a request to a list of actions for BSS core and OSS systems. Other functions of the BSS mapping engine will be evident through the illustrative descriptions below in the context of FIGS. 5 through 7.

BSS core module 208: This is the component which provides business support functions such as, for example, billing, reporting, subscription/order management, and so on. Of course, other types of BSS functions may be part of the core.

Service offering BSS interface module 210: This is the interface used to facilitate the communications between the BSS 104 and OSS systems 106-1, 106-2 ... 106-N. Given the inventive teachings provided herein, one ordinarily skilled in the art will appreciate various straightforward implementations of the service offering BSS interface 210.

On the portal 102, when a user conducts an operation, one or more functions in the BSS API 202 are called. Subsequently, one or more requests are generated and sent to the BSS mapping engine 206. The BSS mapping engine 206 then consults the ontology domain knowledge repository 204 to map the one or more requests to one or more lists of actions to be executed by the BSS core 208 and the back-end OSS systems 106-1, 106-2 ... 106-N. The order of the actions (i.e., which action is executed first, which second, and so on) is also determined by the BSS mapping engine 206.

Accordingly, BSS 104 may be considered an embodiment of a business support system (BSS) for provisioning network assets to one or more users for users to operate and manage the assets. Thus, the BSS comprises one or more user interfaces that provide service offering information to a user about service offerings of a plurality of service providers. The BSS also comprises a selection function on the user interface used to select one or more of the service offerings. Such interfaces and selection function may be realized via portal 102 and BSS API 202. The BSS also comprises one or more interfaces that connect to one or more locations on one or more networks, each of the locations having one or more network assets associated with the selected service offering and the respective service provider. For example, the locations could be the OSS systems 106-1, 106-2 ... 106-N, and the interfaces that connect to the locations could be the service offering BSS interface 210. More generally, the locations can be one or more network locations on a computer network, and the network location may comprise a network site of the service provider of the service offering requested by the user.

The BSS also comprises a mapping function that matches the user selection to one or more provisioning processes, wherein when the provisioning processes are executed, and one or more physical network resources are provisioned to the user from one or more of the network locations in an order that the user can use the service. The BSS mapping engine 206 is an example of such a mapping function.

The illustrative embodiments of methodologies performed by the BSS mapping engine 206 will be described below in the context of FIGS. 5, 6 and 7. However, first, illustrative embodiments of an ontology and a state machine associated therewith are described in the context of FIGS. 3 and 4.

Figure 3:
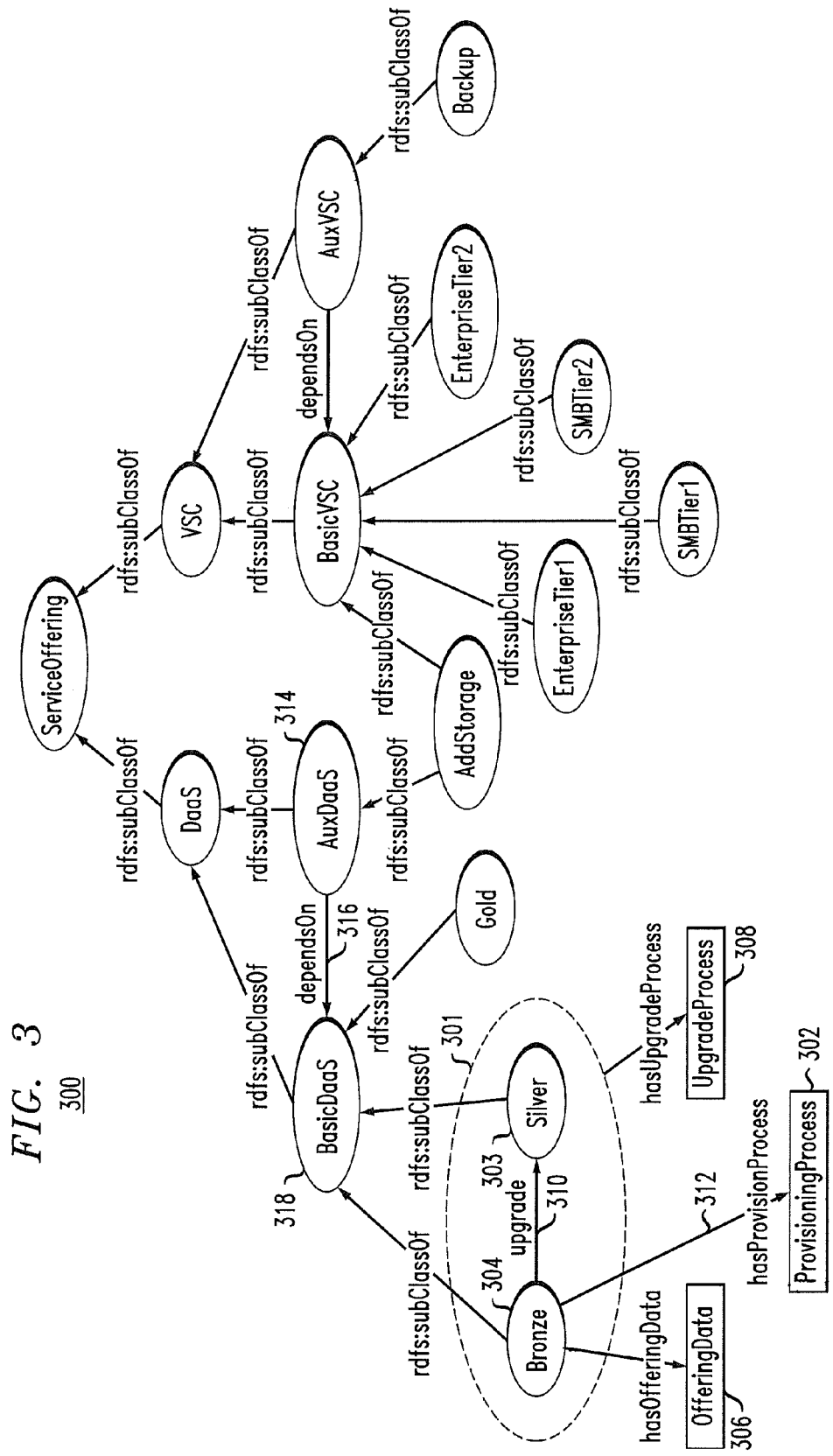
FIG. 3 is a diagram of a conceptual depiction of hierarchical relationships in an ontology of service offerings used in an ontology domain knowledge component of a business support system, in accordance with an embodiment of the invention.

FIG. 3 shows an example of a domain ontology, which describes the resources in two services offerings (DaaS and VSC) as well as their relationships. It is to be understood that while an ontology may comprise one ontology node, the ontology shown in FIG. 3 comprises multiple ontology nodes in a hierarchical tree structure, i.e., each ellipse in the figure may represent a separate ontology node. Note that the domain that the ontology in FIG. 3 applies to is cloud computing. However, it is to be appreciated that embodiments of the invention are not limited to any particular domain.

Note from the domain ontology example of FIG. 3 that DaaS has two types of offerings: basic offerings (BasicDaaS) and auxiliary offerings (AuxDaaS). Under BasicDaaS, there are three children: Bronze Desktop, Silver Desktop and Gold Desktop. Under AuxDaaS, there is one child: Additional storage (AddStorage), which is also a child of the BasicVSC class. In addition, there is a "dependsOn" relationship pointing from AuxDaaS to BasicDaaS, which indicates that AuxDaas offerings depend on BasicDaaS offerings. Table 1 below shows examples of entities, relationships between entities, and values of certain properties. Table 1 is one illustrative embodiment of a data structure used to implement an ontology for multiple service offerings in accordance with the BSS 104.

| Subject | Property | Object |
|---|---|---|
| Bronze | isa | BasicDaaS |
| Bronze | upgrade | Silver |
| Bronze | hasOfferingData | Instance of OfferingData |
| Bronze | hasProvisionProcess | Link to provisioning process |
| (Bronze upgrade Silver) | hasUpgradeProcess | Link to upgrade process |
| AuxDaaS | dependsOn | BasicDaaS |

Figure 4:
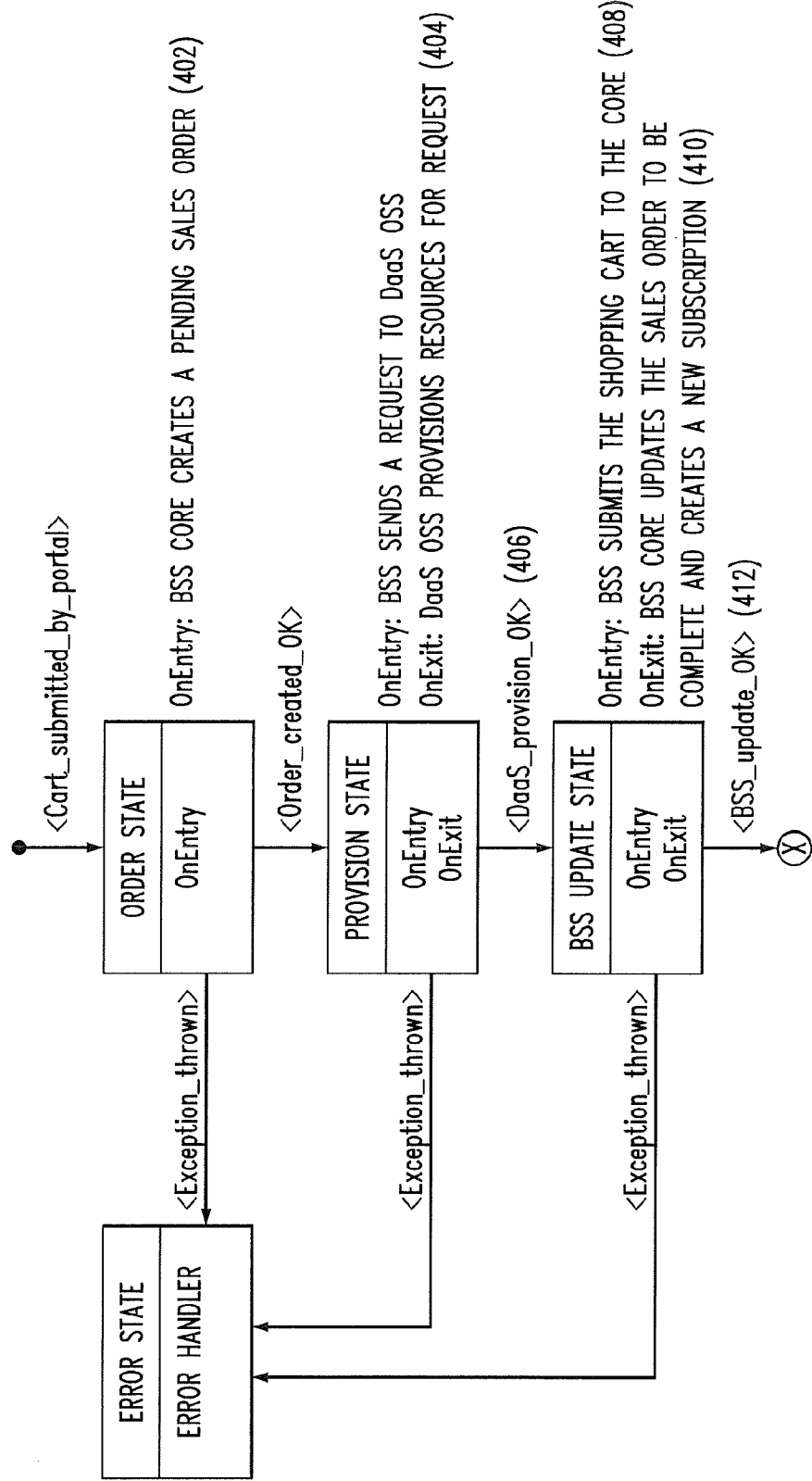
FIG. 4 is a block diagram of a state machine that illustrates a provisioning process associated with an illustrative service, in accordance with an embodiment of the invention.

Illustrative embodiments of the invention then associate state machines and rules to ontology nodes in order to handle requests from the portal 102 (FIG. 2). In one illustrative embodiment, the property "hasProvisionProcess" is used to associate a provisioning process 302 with the Bronze node 304. The process 302 can refer to a state machine 400, as shown in FIG. 4, which specifies the following steps for a provisioning request:

(1) BSS core (208 in FIG. 2) creates a pending sales order (step 402);

(2) DaaS OSS system (106 in FIG. 2) provisions a block of Bronze desktops (step 404); note that "desktops" are the virtual desktops provisioned in DaaS ("Bronze" is the designation for the quality-of-service (QoS) characteristic associated with this particular level of service; "Silver" and "Gold" being examples of progressively higher QoS levels);

(3) DaaS OSS system returns OK status (step 406);

(4) BSS submits the cart to BSS core (step 408), which changes the status of the sales order to "Completed," and creates a subscription (step 410);

(5) BSS (104 in FIG. 2) returns OK to the portal (step 412)k;

(6) The portal notifies the user.

Then the property "hasOfferingData" associates specific data (certain parameters) with the offerings nodes, including the Bronze node 304. The offering data 306 could include central processing unit (CPU) size, storage and Internet Protocol (IP) address. Note that state machine 400 is only one example of a state machine that can be used for one example node of an ontology formed in accordance with embodiments of the invention.

It is to be appreciated that the ontology 300 in FIG. 3 can, itself, be considered as being implemented as an overall data structure for use with one or more computing systems in embodiments of the invention. Furthermore, within the overall data structure of ontology 300, one or more data structures are maintained and accessible at different levels of the ontology, e.g., one or more parent data structures, one or more child data structures, one or more internal data structures, one or more edge structures, and so on. It is to be understood that the data structures, themselves, that implement the nodes and components of the ontology 300 may be any suitable form of a data structure including but not limited to data trees, data tables (e.g., Table 1 above), and so on.

In general, it is understood that the phrase "data structure" as used herein refers to a particular method or mechanism of storing and organizing data and knowledge in a computing system so that it can be used efficiently. Thus, given a particular data structure, a processing device such as one used to implement the BSS mapping engine 206 may access the data structure and use the data stored therein to execute particular instructions in order to realize the inventive features described herein.

It is also to be appreciated that a given data structure at a given level may have a different function depending on the context of the request, e.g., a parent data structure in one context may be a child data structure in another context, and so on.

Thus, in the overall data structure of ontology 300, there is a leaf level comprising a plurality of offering nodes. The offering nodes, themselves, are data structures containing service offering information. The offering nodes are the leaf nodes in the ontology such as, for example in FIG. 3, "Bronze" 304 and "Silver" 303. The "Bronze" node has a couple of properties such as, for example, hasOfferingData. The rectangle labeled "OfferingData" 306 represents the detailed attributes of "Bronze," such as CPU size, memory size, and so on.

Further, the overall data structure of ontology 300 may comprise one or more internal levels. Each of the internal levels has one or more parent node data structures. Internal data structures correspond to the internal nodes in the ontology, which have one or more children nodes. Note that "internal data structure," "parent data structure" and "child data structure" are referring to the subsumption hierarchy (or graph) formed by the "rdfs:subClassOf" property. For example, "Bronze" is a leaf node in this subsumption hierarchy, because it does not have any more sub-classes. "BasicDaaS" 318 is an internal node, also a parent node, which has two subclasses: "Bronze" and "Silver."

Still further, the overall data structure of ontology 300 may comprise one or more edge data structures. The edge data structure with label "rdfs:subClassOf" has hierarchy information that defines a subordinate relationship either from one of the offering nodes to a parent node or from a lower parent node to a higher parent node. One or more of the parent nodes have attributes that are common to each of the nodes that have a subordinate relation to the respective parent node. Other edge data structures may represent different relationships between the node data structures. One example of an edge data structure that contains a relationship is the data structure that implements the relationship "dependsOn" 316 in FIG. 3.

The overall data structure of ontology 300 also may comprise one or more resource data structures that are associated with one or more of the nodes. The resource data structures define one or more physical network resources required to provision to a user to provide a service described in the service offering information. For example, as shown in FIG. 3, the property "hasOfferingData" associates resource details "OfferingData," which are needed to provision Bronze desktop, with the "Bronze" node.

Also, the overall data structure of ontology 300 may comprise one or more provisioning processes associated with one or more of the nodes, by way of example only, provisioning process 302. The provisioning process is executed such that one or more of the physical network resources are provisioned to the user in an order that the user can use the service. The physical network resources (network assets) may include, but are not limited to, one or more of: a virtual central processing unit (CPU), a computer memory allocation, a storage requirement, a computer program, a data structure, and an IP address.

Note also that two or more of the provisioning processes may be executed in a provisioning sequence wherein the provisioning sequence is determined by a traversal of the overall data structure of the ontology 300. Furthermore, as shown in FIG. 3, the provisioning process may be associated with an offering node such that the provisioning process comprises steps required to provision the physical network assets to allow the user to use the service described by the respective offering node. Also, the provisioning process may be associated with a parent node such that the provisioning process comprises steps required to provision the physical network assets that are in common required by all nodes that are subordinate to the respective parent node.

As shown in FIG. 3, certain of the data structures may be associated with a particular service provider, and also with a particular service offering from a particular service provider.

Still further, the overall data structure of the ontology 300 in FIG. 3 may comprise one or more status data structures. Such status data structures define a status change of one or more of the nodes. For example, the status data structure may define one or more configurations changes required to change the service offering provided from a first offering to a second offering. Also included in the data structure may be one or more status processes that comprise the steps performed to change the configuration defined in the respective status data structure to implement the change from a first offering to a second offering for a user. An example of a status data structure is data structure 301 in FIG. 3, which represents the relationship <Bronze, upgrade, Silver>. The relationship is expressed via a link pointing from "Bronze" to "Silver" with an upgrade property associated with that link.

A status change may include but is not limited to a delete change. That is, the status data structure may define physical network assets to be removed from the service defined in one of the nodes. In such case, the status process prevents the user from using the respective physical network resources. In FIG. 3, it is shown that a service offering, such as "Bronze" can be associated with a provision process which is to create an instance of the "Bronze DaaS" offering. The property "hasOfferingData" connects an offering to its attributes ("OfferingData"). For example, "Bronze" may have a list of attributes in its "OfferingData," such as RAM size and hard drive size. These attributes will be sent to the OSS when an instance of the corresponding offering is created. Similarly, a de-provision process can be associated with an offering to delete its instances from the system. The attributes in the "OfferingData" should be sent to the OSS as well when an instance of the corresponding offering is deleted.

Further, the status change may be a resource change. Here, the status data structure defines physical network assets to be changed for the service defined in one of the nodes, and the status process changes the respective physical network resources that are provisioned.

Another example of a status change is an upgrade change. Here, the status data structure defines physical network assets to be provided to upgrade the service from the first service offering to a second service offering, and the status process further provisions the user with additional physical network resources.

Still further, the status change may be a downgrade change, wherein the status data structure defines physical network assets to be removed to downgrade the service from the first service offering to a second service offering, and the status process further prevents the user from using one or more of the additional physical network resources.

Yet another example of a status change that may be implemented is a service integration. Here, the status data structure defines physical network assets to be modified to integrate one service offering with one or more of other offerings, and the status process causes the necessary integration implementation. That is, some service offerings are integrated offerings across services from different providers. For example, in FIG. 3, the "AddStorage" (additional storage) offering is a subclass of both "AuxDaaS" (auxiliary DaaS) and "BasicVSC." So, it is an integrated service offering which needs support from both "AuxDaaS" and "BasicVSC." This is because it adds additional storage to desktop blocks, yet it also needs management capabilities from VSC.

It is to be appreciated that the above status changes may be provided directly from the service provider to the user, or provided from the service provider through the BSS interface and then to the user.

The overall data structure of the ontology 300 in FIG. 3 may also comprise one or more condition checking data structures. Such data structures comprise rules that define dependencies between two nodes. The ontology may also include one or more condition checking processes for implementing a checking defined by the condition checking data structure. An example of a condition checking data structure may be a "dependsOn" relationship 316.

It is also to be appreciated that a condition checking data structure may comprise one or more of: a pre-requisite resource being provisioned, and a governance requirement being satisfied. For example, in FIG. 3, there is a link pointing from "AuxDaaS" to "BasicDaaS" with a property "depends On," which means that an instance of "AuxDaaS" can not be provisioned without an instance of "BasicDaaS." Such relationship ensures the pre-requisite resource checking. Similarly, service level agreement (SLA) requirements (including governance requirement) can be associated with an offering such that when its instance is created, such requirements will be checked.

It is still further to be appreciated that the overall data structure of FIG. 3 or one or more data structures that comprise the overall data structure, can be transmitted over a network interface, or can be received over a network interface.

Accordingly, as illustratively explained herein, the physical network resources associated with the service offerings are provisioned by executing one or more processes in an order determined by traversing a path through the ontology 300, wherein the ontology 300 has one or more sets of relationships between a plurality of service offerings provided by one or more of the service providers. The ontology 300 further specifies one or more of the provisioning processes required to provision the physical network assets required for one or more of the service offerings. The ontology 300 also specifies a hierarchical structure among the service offerings so that the path determined by the selected service offering defines an order of executing the provisioning processes.

Figure 5:
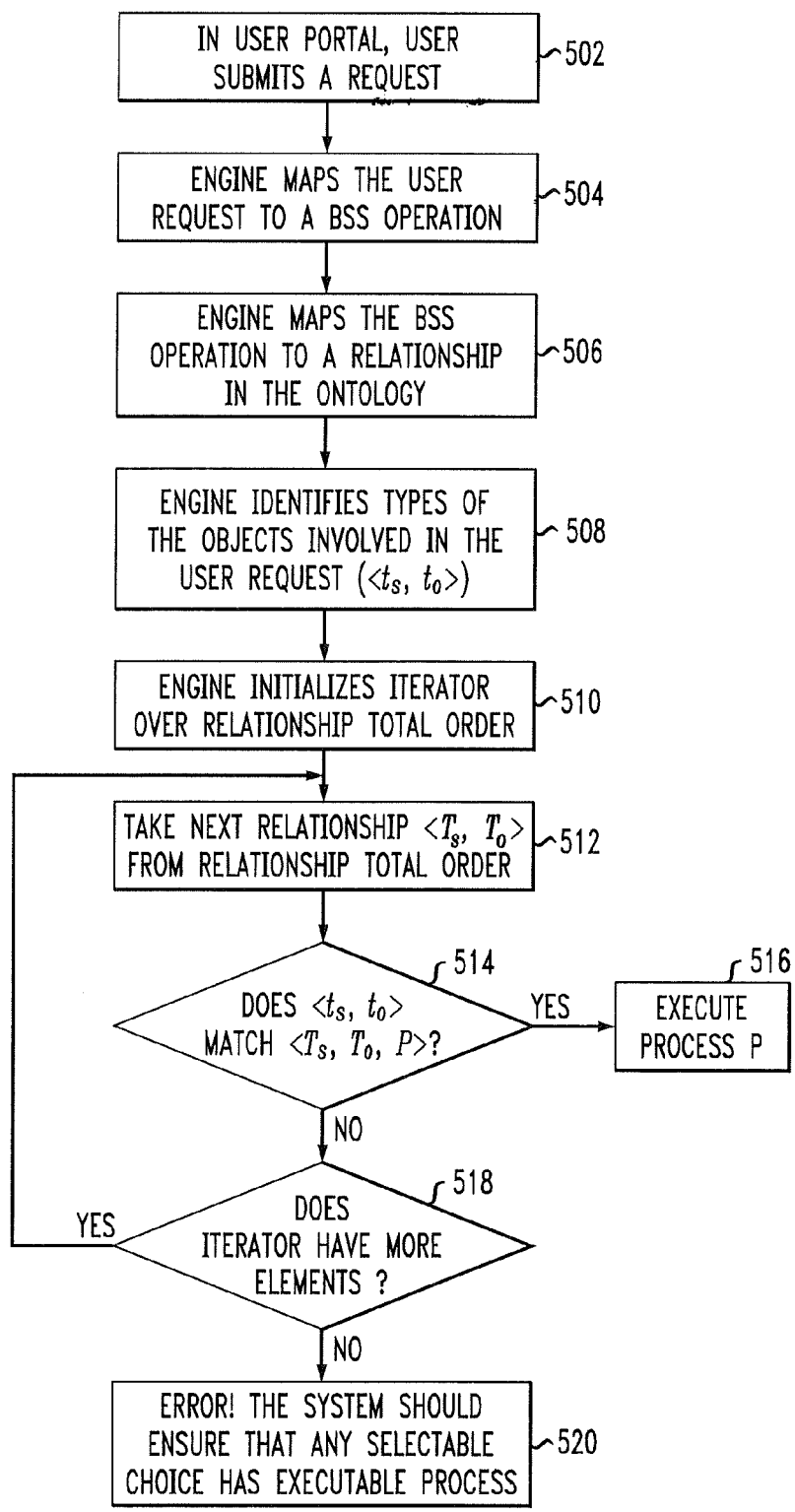
FIG. 5 is a flow chart of a methodology for dynamically locating and executing a process, in accordance with an embodiment of the invention.

Turning now to FIG. 5, a methodology is shown for dynamically locating and executing a process (such as, by way of example only, provisioning process 302), in accordance with an embodiment of the invention. More specifically methodology 500 is performed by the system architecture 100 of FIG. 1. Thus, when appropriate, reference will be made to the components depicted therein.

In step 502, a user (client or customer) submits a request via the user portal 102. For purposes of this illustrative description, a working example is assumed wherein the request made by the user is for upgrading from a Bronze desktop service (Bronze DaaS) to a Silver desktop service (Silver DaaS). Of course, it is to be realized that embodiments of the invention are not limited to any specific request or service.

While the description of FIG. 5 below assumes an upgrade process as being the status process being requested, other types of status processes may be requested including, but not limited to, a service downgrade, adding a cryptographic key (e.g., Secure Shell or SSH key) key, and an operating system patching process.

In step 504, the BSS mapping engine 206 maps the user request to a BSS operation in the BSS core 208. For this specific request in the working example, the user request is mapped into the "upgrading" BSS operation.

In step 506, the BSS mapping engine 206 maps the BSS operation to a relationship in the ontology domain knowledge repository 204. Specifically, for the working example, the "upgrading" operation is mapped to the "upgrade" relationship.

In step 508, the BSS mapping engine 206 identifies the types of objects involved in the specific user request, e.g., $<t_s, t_o>$, where $t_s$ is Bronze and $t_o$ is Silver in the working example (note that s refers to subject and o refers to object as per Table 1 above).

In step 510, the BSS mapping engine 206 initializes an iterator over the relationship total order. For example, for this request, since Bronze and Silver are subclasses of BasicDaaS, BasicDaaS is a subclass of DaaS, and DaaS is a subclass of ServiceOffering, we can add <Bronze, BasicDaaS>, <BasicDaaS, BasicDaaS>, <BasicDaaS, DaaS>, <DaaS, DaaS>, <DaaS, ServiceOffering>, <ServiceOffering, ServiceOffering> into the iterated list. The order is from specific classes to general classes.

In step 512, the BSS mapping engine 208 takes next relationship $<T_s, T_o>$ from relationship total order and, in step 514, determines whether $<t_s, t_o>$ matches $<T_s, T_o, P>$ Basically, step 512 checks if $T_s$ is an ancestor of $t_s$ in the hierarchy formed by subclass relationship and if $T_o$ is an ancestor of $t_o$. If so, $<t_s, t_o>$ then matches $<T_s, T_o, P>$.

If there is a match in step 514, then the process P is executed in step 516. For example, referring back to FIG. 3, since there is an upgrade process (308) associated with the upgrade relationship (310) between Bronze and Silver, and <Bronze, Silver> matches <Bronze, Silver>, which is also the first one in the iterated list, that upgrade process will be selected and executed.

If there is no match in step 514, then in step 518, the BSS mapping engine 206 determines whether the iterator has any more elements, i.e., any more relationships to be considered. If so, then the methodology returns to step 512 and repeats. If not, an error message is returned in step 520. It is preferable that the system ensures that any selectable choice should have an executable process.

Figure 6:
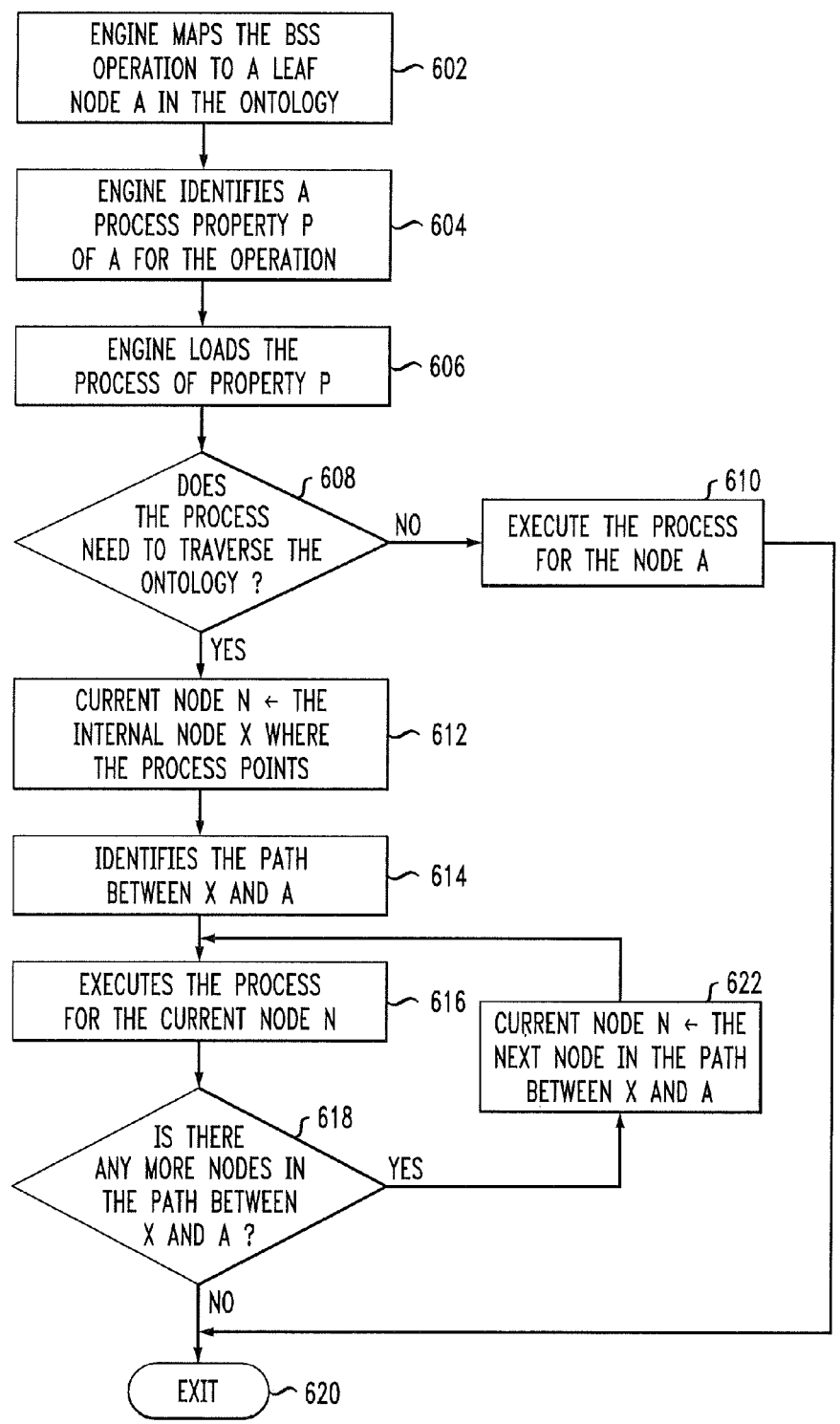
FIG. 6 is a flow chart of a methodology for dynamically locating and executing a sequence of processes, in accordance with an embodiment of the invention.

FIG. 6 shows a methodology for dynamically locating and executing a sequence of processes, in accordance with an embodiment of the invention. More specifically methodology 600 is performed by the system architecture 100 of FIG. 1. Thus, when appropriate, reference will be made to the components depicted therein. It is to be appreciated that FIG. 5 is a methodology for identifying the process associated with a relationship, for example, upgrading from Bronze service to Silver service. FIG. 6 is a methodology for identifying a list of processes and assembling them for an operation on a resource, for example, provisioning Bronze desktops. It is assumed in this desktop-provisioning working example used for explaining FIG. 6 that such operations only involve one type of resource. However, embodiments of the invention are not so limited.

In step 602, the BSS mapping engine 206 maps the BSS operation to a leaf node A in an ontology. For example, given a request for provisioning a block of Bronze desktops, this operation is mapped to the leaf node "Bronze," since it is the resource involved in this request.

In step 604, the BSS mapping engine 206 identifies a process property P of leaf node A for the operation (recall that the operation is what a user request received from the portal is mapped to). For example, for the provisioning operation of the working example, the property is "hasProvisionProcess" (312 in FIG. 3).

In step 606, the BSS mapping engine loads the process of property P and, in step 608, determines whether the process needs to traverse the ontology. If no, then the process is executed for the leaf node A. For example, given the provisioning process associated with the Bronze desktop, it may have all of the steps needed to create a Bronze desktop for the user. In that case, that process will be executed for the Bronze node.

If the process needs to traverse the ontology (step 608), then in step 612, the BSS mapping engine 206 sets the current node N to an internal node X to which the process points. In the working example, suppose the process associated with the Bronze node specifies that the system should execute the process associated with the DaaS node, then execute the process associated with the BasicDaaS node, then finishes the rest of the steps in the process with Bronze. Then, the algorithm will first go to the DaaS node, which is assigned to the node N.

In step 614, the path between node X and node A is identified by the BSS mapping engine 206. Specifically in the working example, the path consists of DaaS, BasicDaaS and Bronze.

In step 616, the process for the current node N (in the working example, the node DaaS) is executed.

In step 618, the BSS mapping engine 206 determines whether there are any more nodes in the path (identified in step 614) between node X and node A. If no, the methodology ends at block 620. If yes, the current node N is set to the next node in the path and the methodology returns to step 616 and repeats. For example, node N will point to BasicDaaS and Bronze accordingly to execute the processes associated with them.

Figure 7:
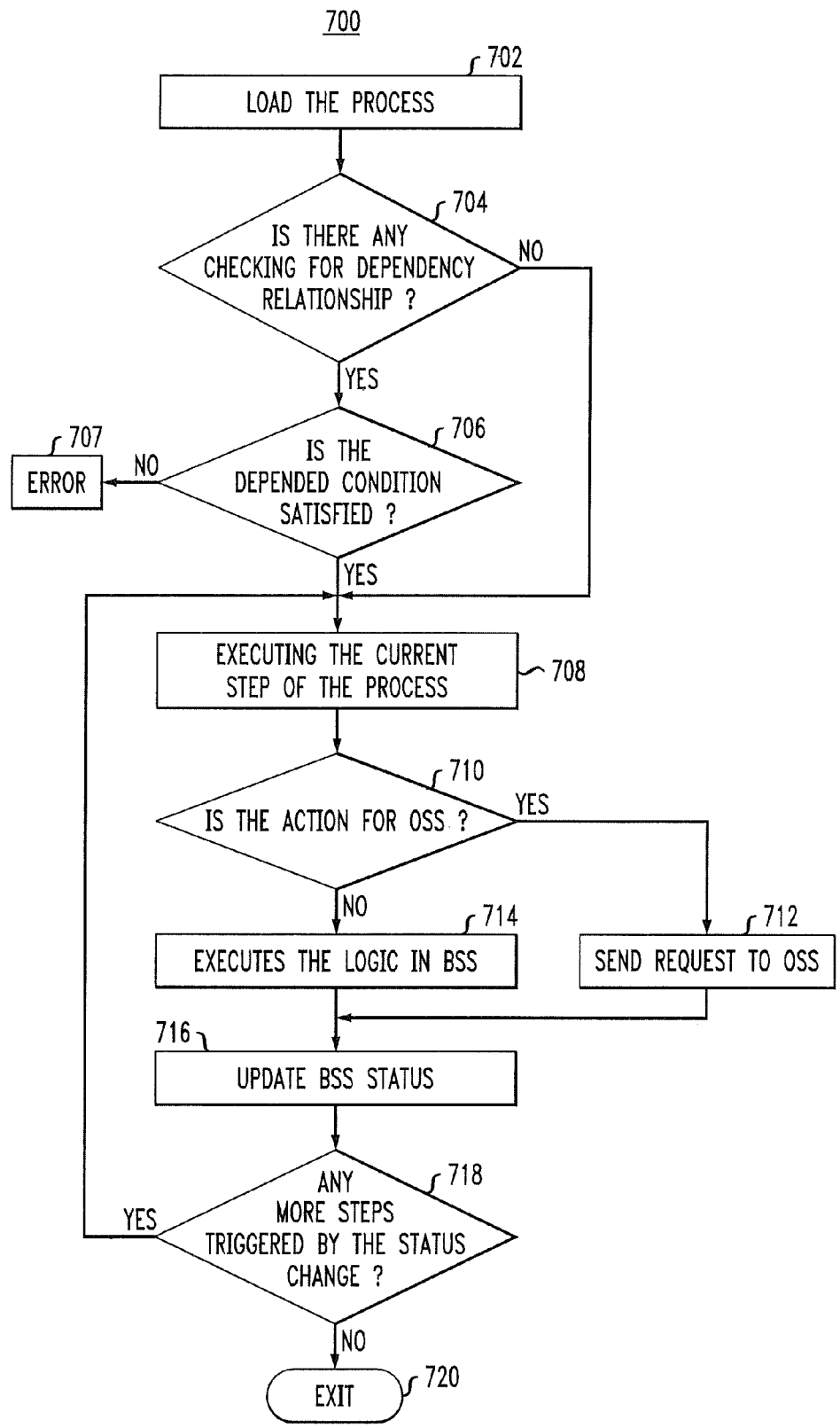
FIG. 7 is a flow chart of a methodology for executing a specific process identified in the methodologies of FIGS. 5 and 6, in accordance with an embodiment of the invention.

FIG. 7 is a flow chart of a methodology for executing a specific process identified in the methodologies of FIGS. 5 and 6, in accordance with an embodiment of the invention. It is to be appreciated that the BSS engine 206 also executes the process, i.e., performs the steps of FIG. 7.

In step 702, the process is loaded, e.g., the process in FIG. 4.

In step 704, it is determined whether there is a check for any dependency relationship. If yes, then a check that the depended condition is satisfied is performed in step 706. For example, when provisioning the AuxDaaS service, since there is a property "dependsOn" (316 in FIG. 3) pointing from AuxDaaS (314) to BasicDaaS (318), the algorithm will check if there is a BasicDaaS instance provisioned upon which an AuxDaaS instance can be provisioned.

If the depended condition is not satisfied (step 706), the algorithm stops with an error (block 707). However, assuming an affirmative result in the dependency check in step 706, the current step of the process is executed in step 708. For example, the first step of the process in FIG. 4 is executed for creating a pending sales order upon the provisioning request (402).

In step 710, it is determined whether the action associated with the step is for the corresponding OSS (106 in FIG. 2) to perform. If so, then in step 712 a request is sent to the OSS via the service offering BSS interface (210 in FIG. 2). For instance, in FIG. 4, upon entry into the Provision State, the step of "BSS sends a request to DaaS OSS" will be executed via the service offering BSS interface.

If not an OSS action, then it is determined that the step is associated with the BSS core 208, and thus the appropriate logic in the BSS core is executed in step 714. For example, step 408 in FIG. 4, i.e., "BSS submits the shopping cart to the core," should be executed in the BSS core 208.

The BSS core status is updated in step 716 in response to steps 712 or 714. For example, certain records in the database of the BSS core 208 will be created or updated to reflect the results of the execution.

In step 718, it is determined whether any more steps are triggered by the state change in the process state machine. If no, then the methodology ends at block 720. If yes, the methodology returns to step 708 and repeats. For example, if the OnExit event of "BSS Update State" occurs and the step associated with that event is executed successfully, the process ends.

As will be appreciated by one skilled in the art, embodiments of the present invention may be embodied as a system, apparatus, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described herein with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-7, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, embodiments of the invention, for example, as depicted in FIGS. 1-7, can also include, as described herein, providing a system, wherein the system includes distinct modules (e.g., modules comprising software, hardware or software and hardware). By way of example only, the modules may include, but are not limited to, a BSS API module, an ontology domain knowledge repository module, a BSS mapping engine module, a BSS core module, and a service offering BSS interface module. These and other modules may be configured, for example, to perform the steps described and illustrated in the context of FIGS. 1-7.

Figure 8:
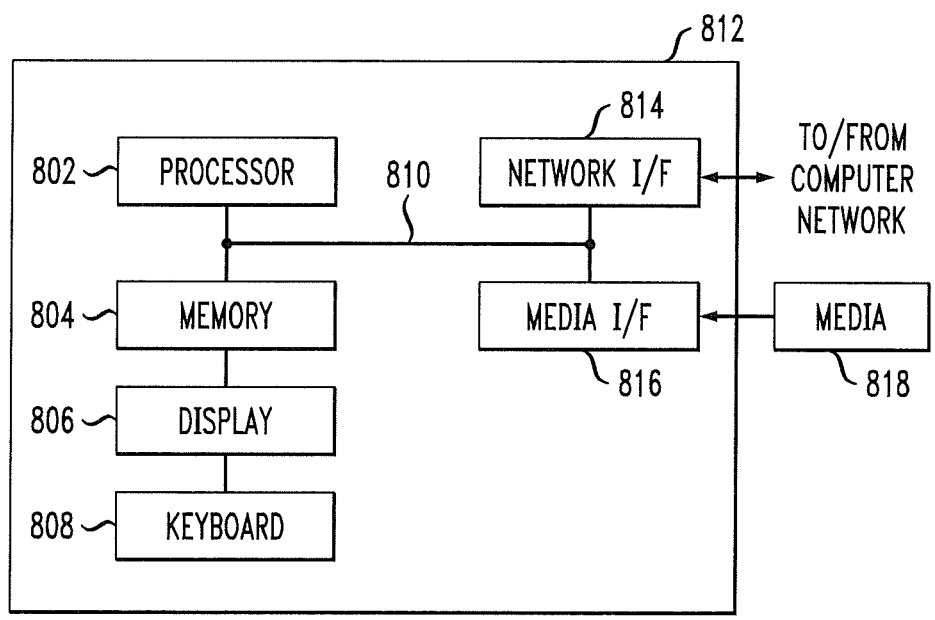
FIG. 8 is a block diagram of a computer system for implementing one or more steps and/or components in accordance with one or more embodiments of the invention.

One or more embodiments can make use of software running on a general purpose computer or workstation. With reference to FIG. 8, such an implementation 800 employs, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 802, memory 804, and input/output interface such as display 806 and keyboard 808 can be interconnected, for example, via bus 810 as part of a data processing unit 812. Suitable interconnections, for example, via bus 810, can also be provided to a network interface 814, such as a network card, which can be provided to interface with a computer network, and to a media interface 816, such as a diskette or CD-ROM drive, which can be provided to interface with media 818.

A data processing system suitable for storing and/or executing program code can include at least one processor 802 coupled directly or indirectly to memory elements 804 through a system bus 810. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 808, display 806, pointing device, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 812 as shown in FIG. 8) running a server program. It will be understood that such a physical server may or may not include a display and keyboard.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A business support system (BSS) for provisioning computing network assets to one or more users for users to operate and manage the assets, the system comprising:
   one or more user interfaces that provide service offering information to a user about service offerings of a plurality of service providers;
   a selection function on the user interface used to select one or more of the service offerings;
   one or more interfaces that connect to one or more locations on one or more networks, each of the locations having one or more network assets associated with the selected service offering and the respective service provider; and
   a mapping function that matches the user selection to one or more provisioning processes, wherein when the provisioning processes are executed, and one or more physical network resources are provisioned to the user from one or more of the network locations in an order that the user can use the service.

2. A system, as in claim 1, wherein the asset includes one or more of: a memory allocation, an amount of storage, a virtual machine, an internet protocol (IP) address, and a computer program.

3. A system, as in claim 1, wherein one or more of the interfaces is an application programming interface (API) which is used to connect the BSS to one or more operational support systems (OSS) each associated with one of the respective service providers, the OSS establishing one or more relationships between the selected service offering and one or more of the network assets.

4. A system, as in claim 1, wherein the provisioning processes are executed on one or more of: the BSS and an operational support system (OSS).

5. A system, as in claim 1, wherein the service offerings are a set of service offerings provided by more than one provider.

6. A system, as in claim 1, further comprising one or more status processes that are performed to change a service offering.

7. A system, as in claim 6, wherein a status process performs one or more of: an upgrade, a downgrade, adding a key, and patching an operating system.

* * * * *